United States Patent [19]

Potrykus

[11] Patent Number: 4,464,068

[45] Date of Patent: Aug. 7, 1984

[54] FOIL SLIDING BEARING IN PARTICULAR FOR PUMPS USED IN CHEMICAL PROCESSES

[76] Inventor: Franz Potrykus, Universitätsstrasse 75, 4630 Bochum 1, Fed. Rep. of Germany

[21] Appl. No.: 101,519

[22] Filed: Dec. 10, 1979

[30] Foreign Application Priority Data

Dec. 8, 1978 [DE] Fed. Rep. of Germany ....... 2853146

[51] Int. Cl.³ .............................................. F16C 32/06
[52] U.S. Cl. .................................................... 384/103
[58] Field of Search ............... 384/103, 106, 104, 125, 384/380; 308/DIG. 7

[56] References Cited

U.S. PATENT DOCUMENTS

| | | | |
|---|---|---|---|
| 3,097,060 | 7/1963 | Sullivan | 308/DIG. 7 |
| 3,893,733 | 7/1975 | Silver et al. | 384/106 |
| 3,951,234 | 4/1976 | Fisher | 384/103 |
| 3,957,317 | 5/1976 | Silver | 384/103 |

Primary Examiner—Lenard A. Footland

[57] ABSTRACT

A foil sliding bearing for machines, in particular a foil sliding bearing for glandless rotary and centrifugal pumps used in chemical processes, such as for pumping corrosive liquids, and adapted to be lubricated by the liquid being pumped (centrifugal pumps, gap-tube pumps, and the like) is provided. This bearing comprises a bearing sleeve to be positioned between a bearing pin or a shaft and a coaxial cylindrical or slightly conical bearing housing of the machine. Around the outer periphery of the bearing sleeve a plurality of plastic foil sections are held at their front ends each, as seen in the direction of rotation, in axial slots formed in the bearing sleeve and which do not extend up to the edges, and at their rear ends they lie loosely on the outer bearing sleeve and leave an expansion gap free with respect to the adjacent foil sections. The sliding clearance between the foil sections and the bearing surface of the bearing housing is greater than in conventional sliding bearing and is dimensioned to about 0.3 to 1 mm.

13 Claims, 6 Drawing Figures

FOIL SLIDING BEARING IN PARTICULAR FOR PUMPS USED IN CHEMICAL PROCESSES

FIELD OF THE INVENTION

The present invention relates to a foil sliding bearing, in particular a foil sliding bearing for glandless rotary and centrifugal pumps used in chemical processes, such as for pumping corrosive liquids, and adapted to be lubricated by the liquid being pumped (centrifugal pumps, gap-tube pumps, and the like). in this type of sliding bearing a bearing sleeve is provided to be positioned between a bearing pin or a shaft and a coaxial, generally cylindrical bearing housing, either actually cylindrical or slightly conical in shape. On this bearing sleeve a plurality of foil sections are held at their front ends each, as seen in the direction of rotation, in axial slots formed in the bearing sleeve, and at their rear ends they lie loosely on the bearing sleeve. A bearing bushing may be provided. In the case of a glandless pump the invention is concerned with the supporting of the pump rotor.

BACKGROUND OF THE INVENTION

In the simplest form such foil bearings, also referred to as slotted ring bearings, comprise a single foil strip of the width of the bearing and the length of the bearing circumference minus the clearance at the butt joint. The foil is inserted in a corresponding groove in a bearing sleeve, in a housing, or in a shaft or a bearing pin. The foil usually has a thickness of 1.5 mm. The depth of the groove corresponds approximately to half the thickness of the foil. These known bearings are subject to uniform wear over the entire circumference as the foil is not mounted in fixed position but may carry out relative movements. The materials most commonly used are polytetrafluoroethylene plastics, especially with fillers. Such foil bearings offer an inexpensive and convenient solution of many problems associated with bearings. The keeping of spare parts is greatly simplified as the bearing foils may be cut according to need from a piece of foil.

The sliding clearance provided corresponds approximately to that of sliding bearings having metallic sliding surfaces with which the tolerance in bearing clearance must be observed very strictly. While known metallic sliding bearings have poor dry running properties in general, these are improved in simple foil bearings. In known metallic sliding bearings the normal bearing clearance is less than 0.1 mm. The known foil bearings are not suited for extreme loads.

The bearing play of known radial-axial slide supports for pumps and the like among others must be determined in consideration of the operating temperatures. This applies above all to bearings which are lubricated by the medium being pumped, for example in the chemical industry where also contaminations and the like may be contained in the lubricating medium. Often acceptable lifetimes of sliding bearings are achieved only by long-lasting tests, otherwise frequent exchange of bearings will have to be put up with. Under any circumstances, the pairing of materials of different hardness for the bearing sleeve and the bearing pin must be kept in mind, as the medium to be pumped restricts the choice of materials. This renders the association of the individual materials very difficult.

Another disadvantage of sliding bearings which are lubricated by the medium being pumped is that they must not be let run dry. It still belongs to the state of the art of pumps that their bearings must not be started up dry. It is generally known that a great number of pumps get defective bearings within seconds because this instruction is disregarded. The disassembly and exchange of the bearings involve high costs and the preventive measures to be provided cost a lot of time and money. The operational safety is endangered.

Also known are shaped foil bearings in which overlapping metal foil sections are spaced around the interior surface of a bushing in continuous slots (U.S. Pat. No. 3,957,317). These may not be utilized in pumps for treatment of chemicals, in particular not as they wear quickly.

SUMMARY OF THE INVENTION

It is, therefore, an object of the present invention to develop a sliding bearing of the kind initially mentioned such that it may also be utilized under higher loads. It is another object of the invention to devise a bearing of the kind in question which is operationally safe even in high capacity pumps. It is yet another object of the invention to provide a bearing of the kind specified which practically excludes the risk of destruction even upon dry start-up in centrifugal pumps.

These and other objects which will be apparent from the description, are met, in accordance with the invention, in that the foil sections are held at the outer periphery of the bearing sleeve in axial slots which do not extend up to the edges of the sleeve and leave an expansion gap free at their rear ends, as seen in the direction of rotation, with respect to the adjacent foil sections, and that a sliding clearance of about 0.3 to 1 mm is provided between the foil sections which are supported and the bearing surface of the bearing housing.

Around the periphery of the bearing sleeve, a plurality of foil sections extending in circumferential direction are retained, at their leading edge in rotational direction, in axial slots which are formed in the bearing sleeve so as not to extend to the edges of the sleeve. At their trailing edges the foil sections are supported without being fixed on the outer periphery of the bearing sleeve, with an expansion gap or clearance at the joint between each two adjacent foil sections. A sliding clearance of about 0.3 to 1 mm is provided between the supported foil sections and the bearing surface of the bearing housing, i.e. a clearance which is much greater than the play of known sliding bearings.

Conveniently, the front ends of the foil sections extend through the axial slots up to the inner periphery of the bearing sleeve against which they are bent around the lower edge of the axial slots. The bearing sleeve is provided at its edges with collars which project inwardly and by means of which the bearing sleeve is supported on the rotatable inner member, in other words the shaft or the bearing pin. The front upper edges of the portions of the bearing sleeve that define the axial slots, as seen in the direction of rotation, should be rounded at a great radius to permit unobstructed entry of the lubricant into the space between the outer surface of the foil sections and the inner bearing surface of the bearing housing. The lubricant will flow between the outer periphery of the bearing sleeve and the inside of the rear portions of the foil sections, contrary to the direction of rotation, if apertures for the passage of lubricant are provided at certain spacings between the axial slots and the bearing sleeve is so designed that the lubricant can enter the space between the inner periphery of the bearing sleeve and the shaft or bearing pin, for instance through a lubricant channel extending inside the shaft or bearing pin. The lubricant will then reach the wedge-shaped gap at the front end of the foil sections formed between the outside of the foil sections and the bearing surface of the bearing housing.

In operation, the centrifugal force acting especially on the rear part of the foil sections causes the latter to move outwardly so as to abut radially against the inner bearing surface of the bearing housing. This inner bearing surface may be formed in the housing proper or preferably in a corresponding bearing box or bearing bushing. It is in particular the internal pressurization of the foil sections through the radial apertures in the bearing sleeve which provides essential stabilization for the multiple sliding surface bearing in accordance with the present invention. The lubricant passing the apertures, which lubricant may be the medium being pumped, pressurizes in particular the rear portion of the foil sections which finds support on the bearing housing. This has the effect that the shaft supported in the bearing is better stabilized by the pressure.

Surprisingly, it has been found that the design according to the invention of sliding bearings for pumps, at lower production costs, affords excellent running properties and that even ideal running conditions are obtained in operation since the flow of lubricant presses the rear portions of the foil sections outwardly and the lubricant exiting there builds up a lubricant wedge in the front areas of the successive foil sections. Thus the optimum sliding clearance or bearing play required is created automatically. Therefore, at equilibrium operating condition the bearing runs contactless. The friction value is extremely low, as is the case with conventional sliding bearings with operation without contact. Also the assembly is easy because of the relatively great bearing clearance. The dry running properties are excellent. The replacement of worn foil sections is almost as easy as in known foil sliding bearings.

The sliding clearance in general is in a range from 0.3 to 1 mm. The bearing clearance preferred is in a range from about 0.4 to 0.5 mm.

Although polytetrafluorethylene materials are preferred for the sliding foil sections, other comparable plastic foils developed in the meantime are useful, provided they are compatible with the medium being pumped if this is utilized for lubrication of the pump.

The foil sliding bearings according to the invention permit much higher loads than the known simple foil sliding bearings with a single piece of foil which extends practically over the entire periphery of the bearing pin or bearing sleeve because the shape of the foil strip does not contribute to the establishment of the lubricant wedge.

Even greater stabilization of the rotating internal member may be achieved if the centrifugal force acting on the rear area of the foil sections is increased. A modification of the sliding bearing provides for a bar to be included at the rear end of the foil sections at their inside, parallel to the axis, so as to increase the weight. A longitudinal groove receiving the thickening thus formed is provided in the outer periphery of the bearing sleeve.

In many cases of practical application it is desired that the sliding bearing should operate to fix the rotatable internal member not only in radial direction but also in axial direction. For this purpose it is provided in another embodiment of the invention that the foil sections extend axially beyond the bearing sleeve at least at one side and that at least one radial abutment shoulder is formed directly or indirectly at the bearing housing. The bearing with the foil sections runs up against this shoulder. Often this arrangement will be provided at both sides of the bearing sleeve so as to obtain axial fixing in both directions.

If particularly great axial forces are to be taken up, in particular in pumps under unsymmetrical axial loading, it is convenient for radial webs to be formed at the sides of the foil sections engaged with the end faces of the bearing sleeve. They contact the abutment shoulders of the bearing housing. In certain cases it is favorable if the radial webs project not only in front of the end faces of the bearing sleeve but also radially beyond the outer periphery. In that event, however, a corresponding annular groove is to be provided in the bearing housing.

For axial positioning or axial fixing, the foil sections may also be formed integrally with webs which engage freely in peripheral slots in the bearing sleeve. These webs may be disposed centrally or off center between the ends. Just like the outer radial webs, also these webs conveniently are cut with several radial slits to maintain the radial flexibility of the foil sections.

The bearing in accordance with the invention offers a number of advantages. For instance, it is sufficient to observe geometric accuracy of the bearing members without having to pay attention to especially strict small tolerances of the sliding bearing. Furthermore, the surface roughness need not be especially smooth. As the bearing clearance is great, specific measures to allow for thermal expansion need not be taken. The thermal expansion practically may be left unconsidered. The wear of the foil sections in the area of contact with the bearing surface during dry running entails no disadvantages. Although the foil does become shorter as time goes on, it always abuts against the inner bearing surface of the bearing housing under the action of the centrifugal force. The sliding bearing according to the invention can be manufactured at very low cost since no specific precision requirements must be met.

The foil sections are available by the yard and can be cut and exchanged individually by the user to fit his particular need, regardless of fixed bearing sizes. This is a factor which also lowers the costs for keeping necessary stores of materials for the foil sections.

If lubricated by the medium being pumped, the sliding bearing operates contactless. This warrants smooth running. The bearing play is established automatically. Solids in the lubricant which are unavoidable particularly in self-lubricating pumps for chemicals, e.g. centrifugal pumps, especially gap-tube pumps cannot cause any sticking or seizing of the bearing since each individual foil section can avoid the solids.

BRIEF DESCRIPTION OF THE DRAWINGS

Embodiments of the invention will be described further with reference to the accompanying drawings, in which.

DESCRIPTION OF THE PREFERRED EMBODIMENTS

Figures 1A, 1B:
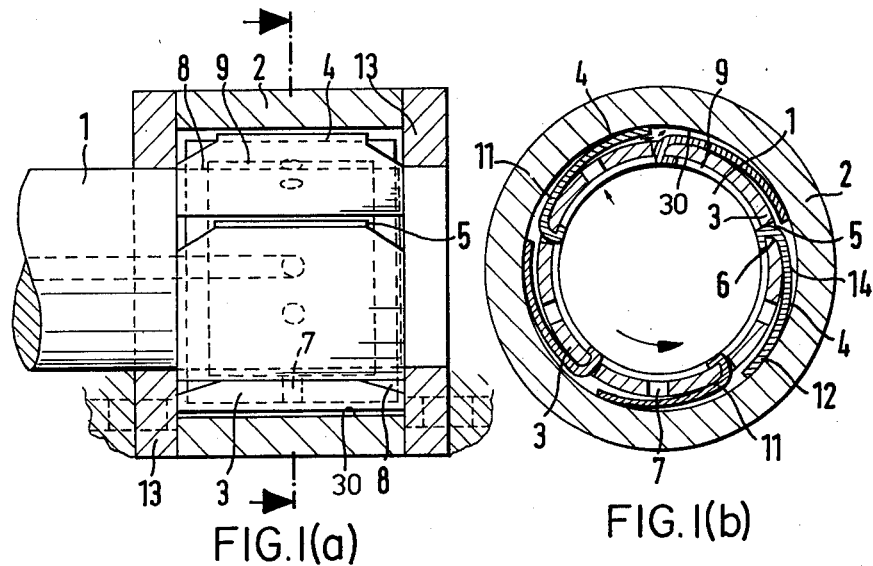
FIG. 1 is (a) a longitudinal sectional view and (b) cross sectional view, the latter taken along the line A-B in the longitudinal sectional view of a first embodiment of a cylindrical sliding bearing according to the invention.

As shown in the drawings, a bearing pin 1 is supported in a housing 2 which has an internal bearing face 30, by interposition of a bearing sleeve 3 slipped over the bearing pin and carrying around its periphery a plurality of foil sections 4. The bearing sleeve 3 has five axial slots 5 which secure the foil sections 4 and are very much rounded off at their front upper edges 6 as seen in the direction of rotation. The axial slots 5 do not extend up to the edges of bearing sleeve 3. Between these slots 5 the bearing sleeve 3 has apertures 7 for the passage of lubricant. Several such apertures may be provided in parallel with the axial slots 5. At both ends the bearing sleeve 3 is supported on the bearing pin 1 by means of collars 8 projecting radially inwardly. This defines a space 9 between the inner circumference of the bearing sleeve 3 and the outer circumference of the bearing pin 1.

The foil sections 4 are narrowed toward the middle at their front ends, with an inclined merger, thus forming tongues 10. These tongues 10 at the front ends 11 are inserted through the axial slots 5 and bent back at the inside so as to lie against the inner peripheral surface of the bearing sleeve 3. In this manner they are sufficiently firmly clamped between the peripheral face of the bearing pin 1 and the inside of the bearing sleeve 3. At their rear ends 12, as seen in the direction of rotation, the foil sections lie loosely on the outer peripheral face of the bearing sleeve 3 and, in operation, move radially outwardly under the effect of the centrifugal force, as may be seen in the sectional view of FIG. 1.

The foil sections 4 project somewhat laterally over the end faces of the bearing sleeve 3 as will be seen in the longitudinal sectional view of FIG. 1. In this manner they contribute to the axial support and fixing of the bearing pin 1. They abut against shoulders formed by thrust shoulders 13 of the bearing housing 2, see left half of FIG. 1.

The sliding or bearing clearance 14 between the outer peripheral face of the foil sections, when assembled, and the bearing face of the bearing housing 2 amounts to 0.4 mm. However, this clearance may also be greater, even greater than 1 mm. As the foils tend to project outwardly upon rotation, the greater clearance will be balanced. The length of the foil sections in circumferential direction is determined by the number of foil sections used along the circumference as the foils should not abut against one another. Rather, an expansion gap must be left free. It is not critical whether or not the deformation of the foil sections is geometrically exact in accordance with the outer diameter of the bearing sleeve or the inner diameter of the bearing housing. Furthermore, the foil sections need not be fixed in the axial slots if the bearing clearance is small enough and the foil sections cannot be pushed over each other. The thickness of the foil sections may be from 1 to 2 mm, on the average 1.5 mm. Greater thicknesses may be selected if the elasticity of the foil, at operating temperature, is sufficient and the foil can still project outwardly in operation by the centrifugal force generated.

Figure 2A:
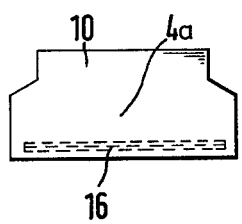
FIG. 2 is (a) a top plan view and (b) assembled view of a foil section provided with a weighting bar.
Figure 2B:
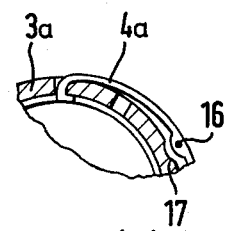

The embodiment of the foil sections 4a according to FIG. 2 shows a bar 16 included in the rear portion, whereby a thickening is produced at the inner side to be received in a longitudinal groove 17 in the bearing sleeve 3a. The weight which is increased by this bar 16 enhances the centrifugal force, whereby the bearing becomes more stable because the rear end of the foil sections abuts more firmly against the bearing face of the bearing housing.

Figure 3:
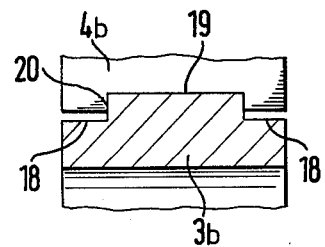
FIG. 3 is a diagrammatic sectional view of a special design of the bearing sleeve and foil section.

As shown in FIG. 3, the lateral definition of the rotating member, i.e. of bearing pin 1 may be obtained by a design of the bearing sleeve 3b such that its marginal zones 18 have a smaller diameter than the greater central portion 19 in between. If the foil section 4b is designed in accordance with the configuration shown of the bearing sleeve 3b, the outer flanks 20 prevent any axial displacement of the bearing pin. Other structural solutions are conceivable as well.

Figure 4:
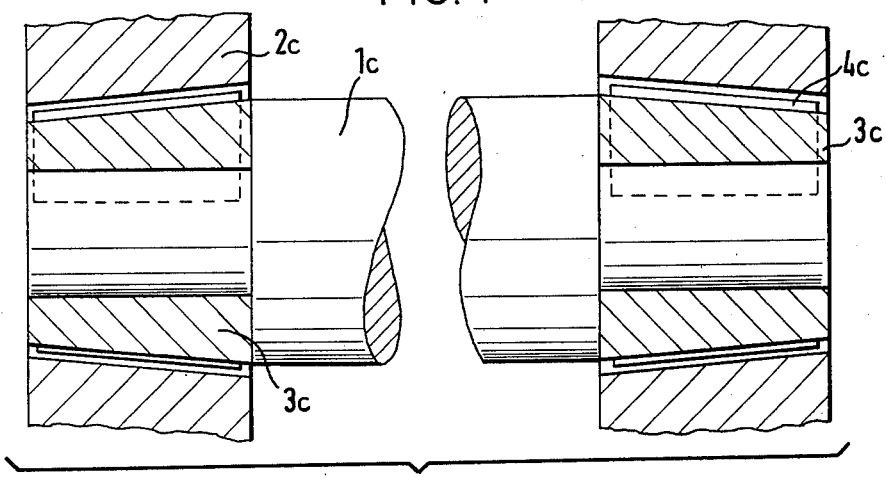
FIG. 4 is a diagrammatic view of the support of a shaft in two slightly conical sliding bearings.

FIG. 4 shows the supporting of two bearing pins 1c of a continuous shaft. In this case not only radial but also axial forces can be accommodated in simple manner by virtue of both bearing pins having slightly conical ends. On these constricted ends bearing sleeves 3c of corresponding conical shape are received which are again provided with foil sections 4c.

Figure 5B:
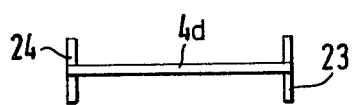
FIG. 5 is (a) a top plan view, (b) end elevation, and (c) side elevation of a foil section with lateral webs.
Figure 5C:
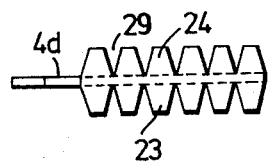
Figure 5A:
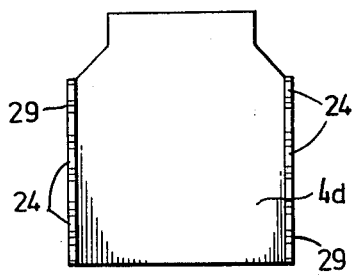

FIG. 5 shows an embodiment of the foil sections 4d which differs from the one according to FIG. 1 by inwardly projecting webs 23 and outwardly projecting webs 24 formed integrally with the foil ends which extend at either side beyond the bearing sleeve. The individual webs 24, for example, are separated by cuts 29.

Figure 6:
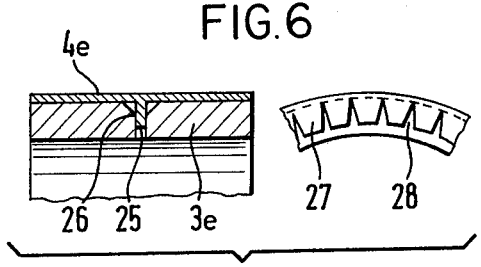
FIG. 6 is a sectional view and partial side view of another embodiment of the bearing sleeve and foil section according to the invention.

FIG. 6 shows the preferred structure for use in narrow space. The foil sections 4e are secured in position axially by inwardly projecting webs 26 which engage in peripheral slots 25 of corresponding length in the bearing sleeve 3e. The individual webs 26 are separated by cuts 28 into five flaps 27 to guarantee the radial flexibility of the foil sections. The bearing sleeve 3e may also be split into two sleeve halves at either side of the slots 25.

What I claim is:

1. A foil sliding bearing for a rotating member journaled in a coaxial, generally cylindrical bearing housing in a glandless rotary pump used in chemical processes and lubricated by the liquid to be pumped, which comprises:
   (a) a bearing sleeve positioned between said rotatable member and said bearing housing; and
   (b) a plurality of sliding foil sections formed of plastic material carried by said bearing sleeve on the outer surface thereof, each of said foil sections:
   (i) being secured at its front end only, as seen in the direction of rotation, in an axial slot formed in the bearing sleeve, which slot does not extend out to either edge of said sleeve,
   (ii) bearing loosely against the bearing sleeve at its rear end, and
   (iii) leaving an expansion gap free at its rear end with respect to the next adjacent foil section.

2. The bearing as claimed in claim 1 wherein the front end of each of said foil sections extends through its associated axial slot to the inner surface of the bearing sleeve.

3. The bearing as claimed in claim 1 or 2, wherein the front upper edges of the portions of the bearing sleeve that define said axial slots, as seen in the direction of rotation, are rounded off.

4. The bearing as claimed in claim 1 or 2, wherein a bar is included in the rear end of each of said foil sections at the inside, parallel to the axis, to increase the weight, and an axial groove receiving the thickened portion of said foil section thus formed is provided in the outer surface of the bearing sleeve.

5. The bearing as claimed in one of claims 1 or 2, wherein apertures for the passage of lubricant from the interior of said bearing sleeve to the space surrounding said bearing sleeve are formed in the bearing sleeve.

6. The bearing as claimed in one of claims 1 or 2, wherein a portion of each of said foil sections that is spaced from said front end extends at least on one side of said bearing sleeve in the axial direction beyond the bearing sleeve, and at least one radial abutment shoulder is provided by said bearing housing to abut said axially extending side portion of said foil section.

7. The bearing as claimed in claim 6, wherein radially slitted radial webs are formed integrally at the sides of the foil sections to abut the end faces of the bearing sleeve.

8. The bearing as claimed in one of claims 1 or 2, wherein radially slitted webs are formed integrally with the foil sections to engage in peripheral slots of the bearing sleeve for axial positioning.

9. The bearing as claimed in claim 1 or 2 in which each of said sliding foil sections has a sliding clearance of about 0.3 to about 1 mm. between the inner bearing surface of said bearing housing and said foil section, which foil section except at its front end is loosely supported by said bearing sleeve.

10. The bearing as claimed in claim 1 wherein the front end of each of said foil sections extends through its associated axial slot beyond the inner surface of the bearing sleeve into reentrant contact with said rotating member to position said bearing sleeve with its inner surface spaced from said rotating member.

11. The bearing as claimed in claim 8 wherein apertures are provided in said bearing sleeve for the passage of lubricant from the interior of said bearing sleeve to the space surrounding said bearing sleeve.

12. The bearing as claimed in claim 9 wherein said apertures are formed in the bearing sleeve at locations underlying said foil sections.

13. A glandless rotary pump for use in chemical processes with the rotary impeller which is journaled in at least one foil sliding bearing as defined in any one of claims 1, 2, 10, 11 or 12.

* * * * *

UNITED STATES PATENT AND TRADEMARK OFFICE
CERTIFICATE OF CORRECTION

PATENT NO. : 4,464,068
DATED : August 7, 1984
INVENTOR(S) : Franz Potrykus

It is certified that error appears in the above-identified patent and that said Letters Patent are hereby corrected as shown below:

Title page:

The assignment of the patent to the following assignee should be shown:

[73] Assignee: Franz Klaus Union Armaturen Pumpen GmbH & Co. Bochum, Federal Republic of Germany --.

Signed and Sealed this

Nineteenth Day of November 1985

[SEAL]

Attest:

Attesting Officer

DONALD J. QUIGG

Commissioner of Patents and Trademarks